May 16, 1944. L. L. WITTER 2,349,066
EDUCATIONAL DEVICE
Filed Aug. 26, 1942 3 Sheets-Sheet 1
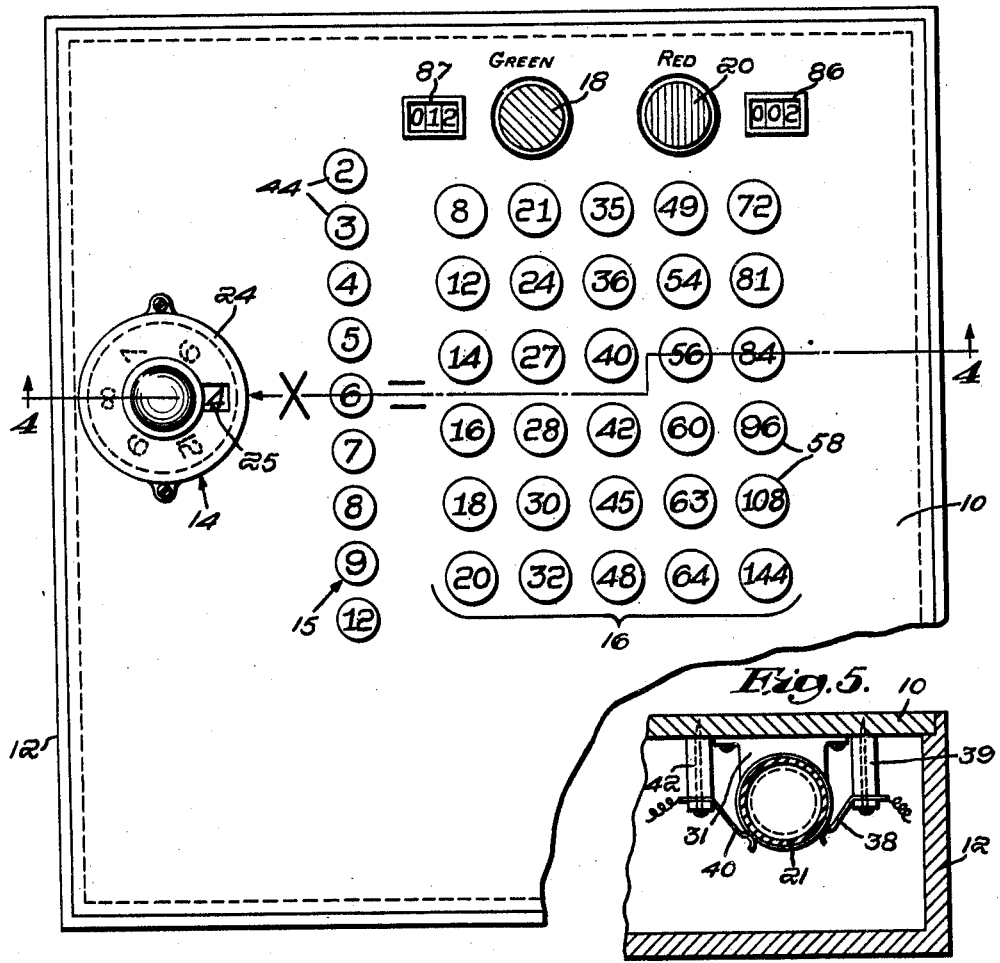
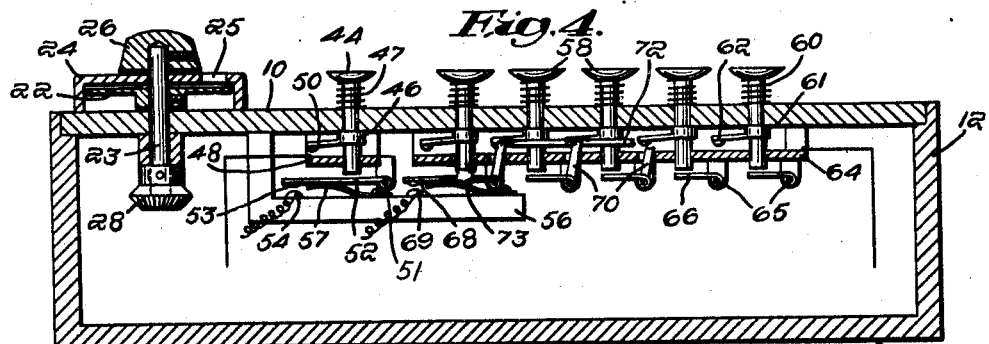
Inventor:
Lawrie L. Witter,
by Kenway & Witter
Attorney

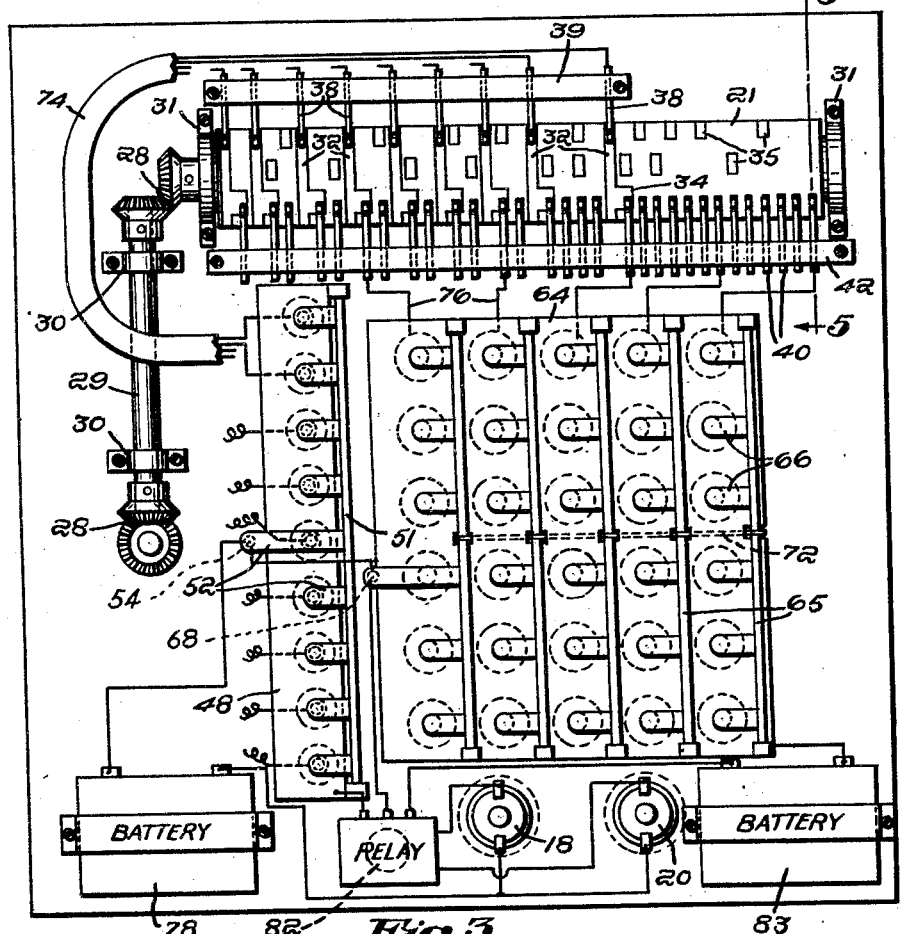
Fig. 2.
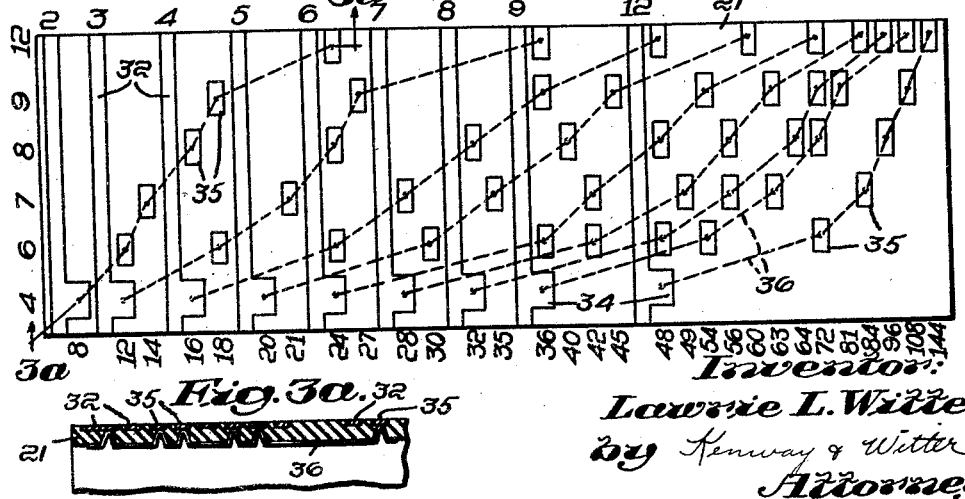
Fig. 3.
Fig. 3a.

May 16, 1944.  L. L. WITTER  2,349,066
EDUCATIONAL DEVICE
Filed Aug. 26, 1942     3 Sheets-Sheet 3
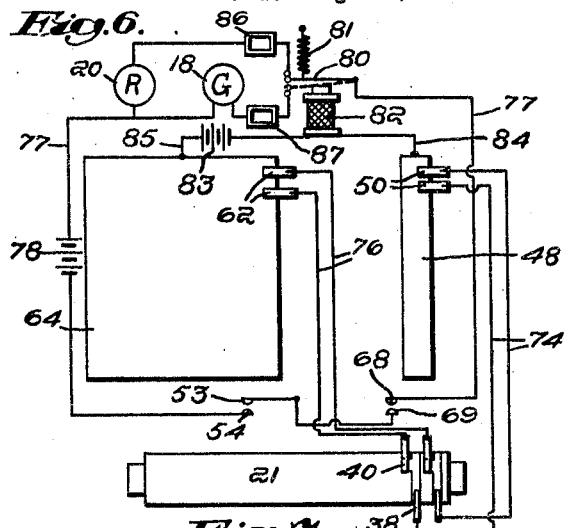
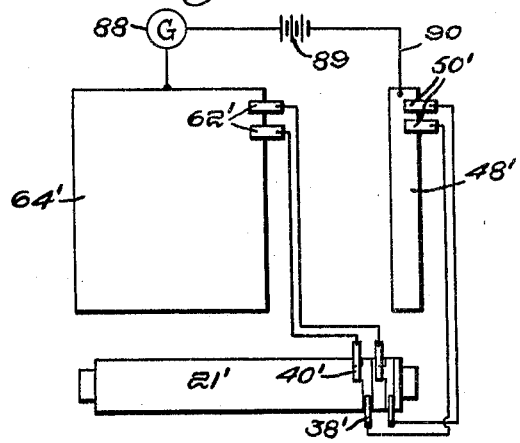
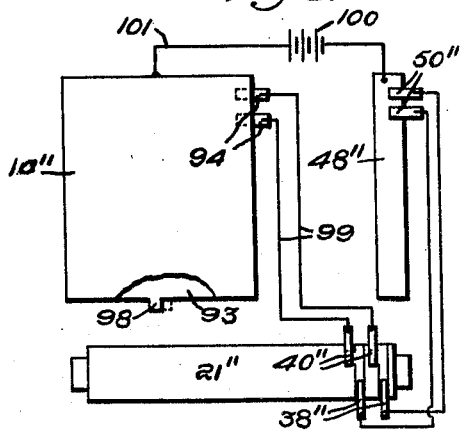
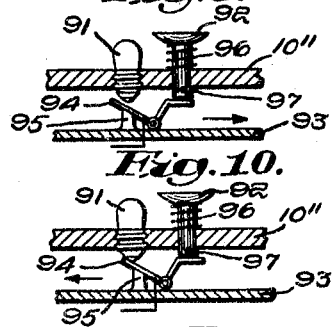
Inventor:
Lawrie L. Witter,
by Kenway & Witter
Attorney Patented May 16, 1944

2,349,066

UNITED STATES PATENT OFFICE 2,349,066

EDUCATIONAL DEVICE

Lawrie L. Witter, Auburndale, Mass.

Application August 26, 1942, Serial No. 456,173

10 Claims. (Cl. 35—22)

This invention relates to educational devices or the like embodying mechanical means for setting up any one of a plurality of predetermined problems, mechanical means indicating the answers to the problems, and means for signaling when the answer corresponding to the problem set up has been selected and its mechanical means moved to the operative position. The invention particularly contemplates the employment of a plurality of symbolized mechanical elements selectively operative in different combinations with other symbolized means to set up any one of a plurality of problems, together with the above described means for presenting the problems and answers concretely in mechanical and visual form.

It is well known that knowledge is acquired more easily and retained more securely by concrete and visual means than by abstract methods. Also, both minors and adults find it easier and pleasanter to learn and retain through a semi-amusement game or apparatus which provides both enjoyment and education. The primary object of my invention resides in the production of a novel mechanical device adapted to present in concrete and amusement form various problems together with the answers and in such manner that the operator, upon selecting the correct answer, is rewarded with a signal indicating the same and, furthermore, is in like manner notified by a different signal should he select the wrong answer.

The invention particularly concerns and is herein illustrated in connection with the multiplication table. Two groups of numerals representing the multiplier and the multiplicand are provided in connection with mechanism for selectively and mechanically setting up different equations by combining any numeral of one group with any numeral of the other group. The product answers to all equations thereby possible are provided and associated with electric switches in turn associated with wiring and a selector for establishing a closed circuit and effecting a predetermined signal when the correct answer switch is closed. The signal can be of any desired character, either audible or visible, and a further feature of the invention contemplates further mechanism for operating a different signal should the operator close a wrong answer switch.

The invention preferably operates electrically and through a selector embodying a plurality of contacts and cooperating brushes, the selector preferably being a rotary cylinder and the contacts being arranged in groups relatively spaced therearound and so electrically connected that the brushes establish different and predetermined circuits in each of the groups as the cylinder is rotated and the different groups brought into engagement with the brushes. The production of an improved selector of this nature together with the associated mechanism for the purpose described comprises a further object of the invention.

These and other features of the invention will be best understood and appreciated from the following description of preferred embodiments thereof selected for purposes of illustration and shown in the accompanying drawings in which, Fig. 1 is a plan view of an educational device embodying my invention, Fig. 2 is a bottom plan view showing the panel of Fig. 1 turned over, Fig. 3 is a development of the contact roll, Fig. 3a is a detail sectional view taken on line 3a—3a of Fig. 3, Fig. 4 is a sectional view taken on line 4—4 of Fig. 1, Fig. 5 is a sectional view of the contact roll, taken on line 5—5 of Fig. 2, Fig. 6 is a bottom plan showing the wiring diagram of the mechanism illustrated in Figs. 1-5, Fig. 7 is a like wiring diagram of a simplified construction, Fig. 8 illustrates another modified construction, and Figs. 9 and 10 are fragmentary views of a switch unit.

Referring first to Figs. 1-6 of the drawings, 10 indicates a cover panel adapted to fit the top opening in a box 12. The operating mechanism in the box is hung from the bottom face of the cover panel in position to be housed within the box when the panel is in place thereon.

The educational device illustrated comprises a selective multiplier in the form of a series of numerals at 14, a selective multiplicand in the form of a series of numerals at 15, and a selective product in the form of a series of numerals at 16. Any one of the multiplier numerals can be combined with any one of the multiplicand numerals to set up varying equations and the product numerals embody the answers to all of such equations. I have limited the multiplier to six numerals, 4, 6, 7, 8, 9, and 12, which together with the nine multiplicand numerals 2-9 and 12 serve to provide the most difficult equations in the multiplication table. The device includes a green lamp 18 and a red lamp 20 together with suitable electrical circuits, including a selector contact roll 21, for illuminating the green lamp when the correct quotient number button is depressed and for illuminating the red lamp should a product button other than the correct one be depressed.

The multiplier numerals 14 are carried on a disk 22 affixed to a vertical shaft 23 in the panel 10, the disk being housed within a casing 24 secured to the top face of the panel and having an opening 25 therethrough for exposing one of the numerals. The shaft may be rotated by a knob 26 and it is rotatably connected to the contact roll 21 through beveled gears 28 and an intermediate shaft 29, the shaft and roll being secured to the lower face of the panel by suitable brackets 30 and 31.

The contact roll 21 is a cylinder of insulation material and has nine copper bands 32 therearound, the bands having off-set portions 34 providing a set of nine contacts in longitudinal alignment along the roll. Forty-five other contacts 35 are provided on the roll and embody five groups equally spaced around the roll with nine contacts in each group extending longitudinally along the roll. Each band 32 is connected by a wire 36 to five contacts 35, in addition to its integral contact 34, each band 32 being connected to a contact in each of the six rows of contacts extending longitudinally along the roll.

Nine brushes 38 on an elongated support 39 attached to the panel 10 are respectively in contact with the bands 32. The fifty-four contacts 34 and 35 are arranged in six groups of nine contacts each, the groups being equally spaced around the contact roll and the nine contacts of each group being in alignment longitudinally of the roll. These contacts represent all possible quotients resulting from combining the multipliers at 14 with the multiplicands at 15, and the contacts are arranged to be engaged by thirty brushes 40 carried on an elongated support 42 attached to the panel 10, the brushes being in spaced relation along and resting on the roll in position to engage the contacts as the roll is rotated. Such products as 12, 18, 24, etc. which result from more than one equation (as 3×4 and 2×6=12) are arranged in annular alignment around the roll in position to be engaged by a single brush.

The multiplicand numerals at 15 are applied to a series of nine buttons or keys 44 having stems of insulation material mounted for vertical sliding movement in the panel 10. A collar 46 is affixed to each stem and a spring 47 normally holds the key upward with its collar in stop contact with the panel. The stems extend through a copper plate 48 secured to the panel and providing a common contact for other contacts 50 carried by resilient switch arms affixed to the collars 46. A shaft 51 carried by the panel 10 is provided with nine fingers 52 directly beneath the stems 44. One finger is extended and carries a contact 53 adapted to cooperate with a contact 54 carried by a bracket 56 hung from the panel. A spring 57 normally holds the contact 53 in raised position. The arrangement is such that the depressing of any key 44 first closes its contact 50 and thereafter closes the contact 53.

The product numerals at 16 are likewise all applied to a series of thirty buttons or keys 58 provided with springs 60, stop collars 61 and switch contacts 62. The stems 58 extend through a copper plate 64 hung from the panel and providing a common contact for the contacts 62. Five shafts 65 and fingers 66, like the shaft 51 and fingers 52, are provided beneath the plate 64, one finger being extended and carrying a contact 68 adapted to cooperate with a contact 69 on the bracket 56. Arms 70 extending upwardly from the shafts 65 and connected by links 72 (Fig. 4) serve to connect the shafts for unitary movement. A spring 73 normally holds the contact 68 in raised position.

The nine contacts 50 are respectively connected by wires 74 to the nine brushes 38, the contact 50 on the "2" button stem being connected to the brush that contacts the first band 32, etc., in the order indicated in Fig. 3. The thirty contacts 62 are respectively connected by wires 76 to the thirty brushes 40, the contact 62 on the "8" button stem being connected to the brush that engages the first contact 34, etc., in the order also indicated in Fig. 3.

The circuit through the red lamp 20 (Fig. 6) includes wiring 77, battery 78, switches 53—54 and 68—69, and an armature switch 80 normally held upward in the red lamp 20 circuit by a spring 81. The arrangement is such that when any two buttons at 15 and 16 are depressed and their switches 53—54 and 68—69 closed, the red lamp 20 will be lighted unless the circuit is broken at 80. The electro-magnet 82 of a relay is located beneath the armature switch arm 80 and in position to pivot the arm downwardly when the magnet is energized. Such movement of the switch opens the red lamp circuit and closes the circuit through the green lamp 18.

The circuit through the electro-magnet 82 includes a battery 83 and connections 84 and 85 through the magnet to the plates 48 and 64. This circuit furthermore, includes switches 50, wires 74, brushes 38, contact roll 21, brushes 40, wires 76 and switches 62. The circuit is normally open at the switches 50 and 62. Depressing of any button at 15 closes its switch 50 as also does depressing of any button at 16 close its switch 62. The wiring circuit through the contact roll is so arranged that a closed circuit through the electro-magnet is established when the button depressed at 16 is the correct product of the numeral on the depressed button at 15 and numeral at the opening 25.

When the disk 22 is rotated to the position of Fig. 1 in which the numeral "4" appears at the opening 25, the contact roll 21 is in the position of Fig. 2 wherein nine of the brushes 40 are in engagement with the first row of contacts at 34. Likewise, when the disk is rotated the rows of contacts indicated by the numerals 6, 7, 8, 9 and 12 (Fig. 3) are brought into contact with the brushes 40 as the corresponding numerals appear at the opening 25. With these elements in the position illustrated in Figs. 1 and 2, depressing of the button "2" closes its switch 50 and establishes a circuit from the electro-magnet through the plate 48, switch 50, wire 74, first brush 38, first band 32, first contact 34, first brush 40, wire 76, switch 62 on the "8" button stem. Depressing of the "8" button thereupon closes its switch 62 which completes the circuit through the battery 83 by contacting the plate 64. The energizing of the electro-magnet thereupon pulls the magnet switch contact 80 downwardly whereby opening the red lamp circuit and closing the green lamp circuit. The switches 50 and 62 are arranged to close in advance of the switches 53 and 68 whereby opening the red lamp circuit (if the correct product button has been depressed) before closing the switches 53 and 68.

At the top of Fig. 3 I have indicated the numerals of the circuits in contact with the bands 32 from the buttons at 15 and at the bottom thereof I have indicated the numerals of the circuits to the brushes 40 and contacts 34 and 35 from the buttons at 16. The contacts 34 and 35 in each longitudinal row (Fig. 3) are respectively in annular alignment with the brushes 40 connected to switches on buttons 58 which have numerals corresponding to products resulting from the numeral indicated at the left of Fig. 3 multiplied by the numerals 2-9 and 12. For example, the first contact row 8 is in alignment with the brush of button "16" which is the product for 8×2; the second contact in row "8" is in alignment with brush of button "24" which is the product for 8×3, etc. Thus rotation of the disk 22 automatically switches the contacts 34 and 35 into contact with the brushes 40 connected to the correct product buttons for the numeral exposed at the opening 25.

In using the device it may be desirable to ascertain the number of correct solutions effected by the operator as compared with the number of errors made. This can be conveniently indicated by the insertion of two counters 86 and 87 in the red and green lamp circuits, the counters being constructed to accumulate one unit at each impulse in the circuit. The use of such counters is of course optional.

A simplified construction employing only the green lamp is illustrated in Fig. 7. This embodiment of the invention is substantially the same as that above described with the relay together with its circuit and the red lamp eliminated. The copper plates 48' and 64', the contact roll 21', and the circuits therebetween are the same as illustrated in Fig. 6. The green lamp 88 and a battery 89 are in a circuit 90 to the plates 48' and 64'. The arrangement is such that the depressing of a button at 16 which represents the product of the numeral at the opening 25 multiplied by the numeral of a button depressed at 15 closes the circuit and causes illumination of the green lamp. No signal is given if a wrong product button is depressed.

A further form of the invention is illustrated in Figs. 8-10. In this construction both green and red lamps are eliminated and a miniature lamp 91 is mounted in the panel 10" adjacent to each product button 92, the panel being of conductive material. Directly beneath the panel is a non-conductive plate 93 carrying pivoted lamp engaging contacts 94 normally resting on stops 95. The button stems of non-conductive material are slidably mounted in the panel directly over the tails of the contacts 94 so that depressing of a button lifts the corresponding contact 94 into engagement with the base terminal of the lamp. Springs 96 normally hold the buttons in the raised position permitted by stop pins 97. The plate 93 carries a lug 98 by which the plate can be shifted to the two positions indicated in Figs. 9 and 10.

The contact roll 21" and cooperating brushes are the same as above described, as is also the plate 48" and button switches cooperating therewith. Wires 99 connect the brushes 40" with the contacts 94 and a battery 100 is interposed in a connection 101 to the plates 48" and 10".

This form of the invention provides for teaching the multiplication table and testing the knowledge of the pupil. When the plate 93 is in the position of Fig. 10 all contacts 94 are in engagement with their respective lamps. When a multiplier button is depressed, as at 15 in Fig. 1, the lamp adjacent to the corresponding product button 92 automatically lights whereby indicating the correct answer. When the plate is in the position of Fig. 9 and a multiplier button is depressed the corresponding product button 92 must be selected and depressed before its lamp will light. Thus the apparatus can be used to teach the table and also to test the pupil's knowledge thereof.

While the invention has been herein illustrated in connection with the multiplication table it will be readily apparent that it is not limited thereto but is likewise applicable to addition and other question and answer problems.

Having thus disclosed my invention, what I claim as new and desire to secure by Letters Patent of the United States is, 1. An electric circuit selector, comprising a body having an exposed surface, a plurality of groups of contacts on the surface, the groups being relatively spaced in one direction across the surface and the contacts in each group being in alignment in another direction across the surface, means providing a series of electrical connections each connecting a contact in each group with a contact in each of the other groups, the contacts in each of said connections being out of alignment in said one direction, and a plurality of brushes arranged respectively to engage the contacts of the groups in sequence upon relative movement of the surface and brushes in said one direction.

2. An electric circuit selector, comprising a cylindrical body, a plurality of groups of contacts thereon, the groups being relatively spaced around the body and the contacts in each group being in alignment longitudinally of the body, a plurality of substantially annular contacts on and extending around the body, means providing a series of electrical connections each connecting an annular contact with a contact in each of said groups, the contacts in each of said connections being out of alignment circumferentially of the body, a plurality of brushes respectively engaging the annular contacts, and a plurality of brushes arranged respectively to engage the contacts of the groups in sequence upon rotation of the body.

3. In combination, two sets of electric switches having symbols associated therewith, electric circuits associated with the switches, a selector movable to a plurality of predetermined positions and adapted in said positions electrically to connect the circuits of one set of switches respectively with the circuits of the other set of switches in different predetermined combinations, selector-moving means having symbols associated with the symbols of said one set of switches and respectively corresponding to the said positions of the selector, and means for effecting a signal when any two switches in the two sets are closed and their circuits connected through the selector.

4. The combination defined in claim 3 in which the selector and selector-moving means are connected rotary members, and in which the selector embodies a plurality of contacts thereon and brushes cooperating therewith.

5. The combination defined in claim 3, plus another circuit associated with the switches, and cooperating means for effecting another signal when two switches in the two sets are closed and no circuit is established through the selector.

6. In a device for teaching arithmetic, a plurality of electric circuits, contact elements in the circuits, means carrying two relative adjacent groups of numerals associated with certain of the contact elements, means carrying another group of numerals respectively indicating the solutions of combined mathematical problem associations of the numerals individually in one of the said two groups with the numerals individually in the other group, means for selectively adjusting the first named means to positions setting up arithmetical problems comprising a numeral from each of the first two groups, switches in the circuits associated respectively with the numerals in the third group, and means for effecting a signal upon the closing of a switch whose numeral represents the correct solution of the problem set up in the said two groups.

7. The device defined in claim 6 plus means for effecting another signal upon the closing of one of said switches other than that representing the correct solution of the problem set up.

8. The device defined in claim 6 plus means for effecting another signal upon the closing of one of said switches other than that representing the correct solution of the problem set up, one of said signal effecting means including a relay associated with the circuits for opening the circuit to one of the signals and effecting the other signal.

9. The device defined in claim 6 plus miniature electric lamps respectively associated with said numerals in the third group and in circuit with the switches, the lamps being adapted respectively to be lighted as said signal when the corresponding switches are closed.

10. The device defined in claim 6 plus miniature electric lamps respectively associated with said numerals in the third group and in circuit with the switches, the lamps being adapted respectively to be lighted as said signal when the corresponding switches are closed, and means for optionally closing all the switches to a position causing the lamps to light automatically as and when the problems corresponding thereto are set up.

LAWRIE L. WITTER.